(No Model.)
A. SCHMID.
AIR MOISTENING APPARATUS.
No. 462,102.   Patented Oct. 27, 1891.
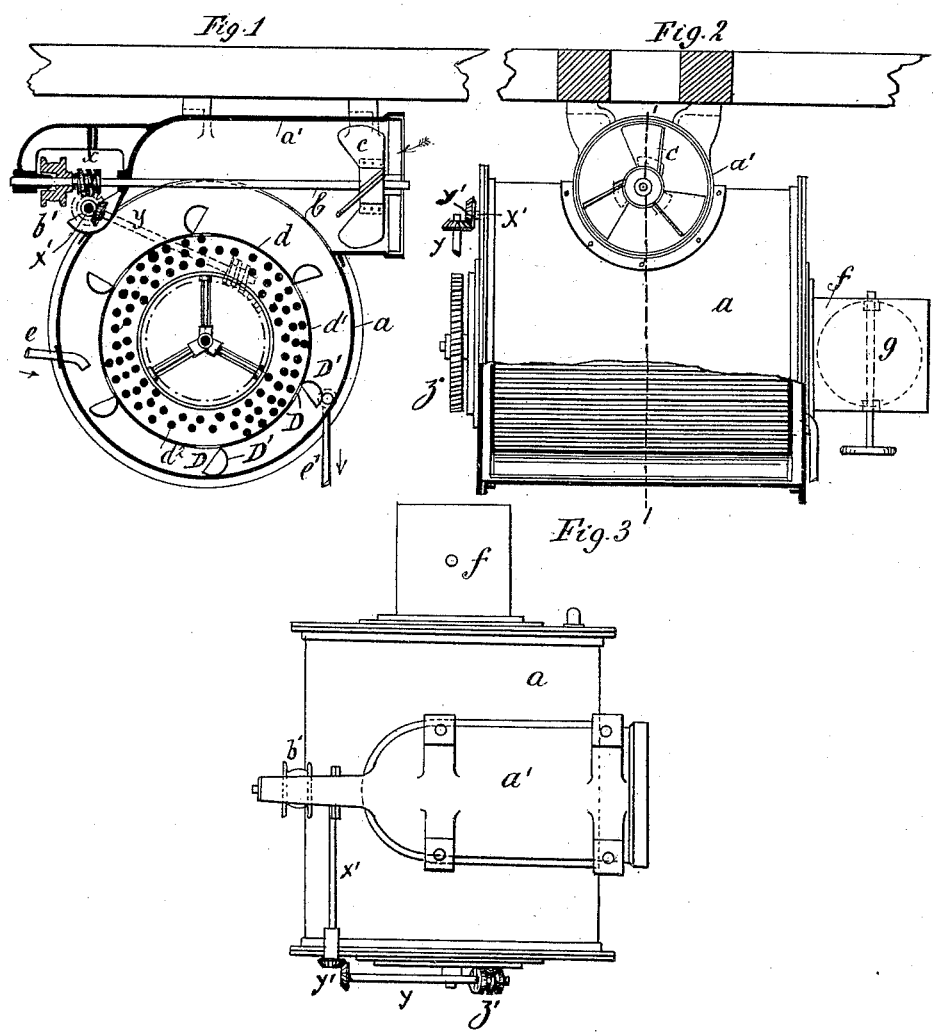
Witnesses:
Marion Hall
Charles Boles
Inventor:
A. Schmid
by Goepel & Raegener
Attorneys.

United States Patent Office.

ALBERT SCHMID, OF ZURICH, SWITZERLAND.

AIR-MOISTENING APPARATUS.

SPECIFICATION forming part of Letters Patent No. 462,102, dated October 27, 1891.

Application filed July 10, 1891. Serial No. 399,000. (No model.)

*To all whom it may concern:*

Be it known that I, ALBERT SCHMID, a citizen of Switzerland, and a resident of Zurich, Switzerland, have invented certain new and useful Improvements in an Air-Moistening Apparatus, of which the following is a specification.

This invention relates to improvements in that class of apparatus that are used for moistening the air in factories, offices, halls, rooms, &c.; and the object of my invention is to provide an apparatus of this kind in which a serpentine or spiral motion is imparted to the air in the apparatus, so as to cause said air to become fully saturated with moisture.

The invention consists in the combination, with a casing, of a fan-shaft and a fan thereon, a drum mounted to rotate in the casing and operated from the fan-shaft, which drum contains a series of rods arranged parallel with the axis of the drum and in serpentine lines, the drum being provided with buckets that raise the water and pour it upon the rods, so as to bring the air passing through the interstices between the rods in contact with the water.

The invention also consists in the construction and combination of parts and details, as will be fully described hereinafter, and finally pointed out in the claims.

In the accompanying drawings, Figure 1 is a vertical transverse sectional view of my improved air-moistening apparatus on the line 1 1 of Fig. 2. Fig. 2 is a side view of the same, parts being broken out and others shown in section; and Fig. 3 is a plan view of the same.

Similar letters of reference indicate corresponding parts.

The cylindrical casing $a$ is provided in its upper part with a lateral extension $a'$, in which the driving-shaft $b$ is mounted, said driving-shaft carrying the fan-wheel $c$ at one end. Said extension $a'$ is provided with a bracket for the opposite end of the driving-shaft, and at said bracket the belt-pulley $b'$ is mounted on the shaft. Within the casing $a$ the drum $d$ is mounted, and the shaft of said drum is provided outside of the casing $a$ with a worm-wheel $z$, that is engaged by a worm $z'$ on one end of a shaft $y$, the opposite end of which is driven by beveled gearing $y'$ from a shaft $x'$, driven by a worm-gear $x$ from the shaft $b$. The several wheels of the gearing are so proportioned that the shaft $b$ rotates at a much higher speed than the drum $d$. The drum $d$ is composed of an exterior shell $d'$, having a series of longitudinal openings D, at one edge of each of which a cup-shaped dipper or bucket D' is provided. In the interior of the drum a series of parallel wooden rods $d^2$ are fastened in serpentine or spiral rows with more or less irregularity, as shown in Fig. 1. A great number of interstices are thus formed within the drum between the several wooden rods, and through said interstices the currents of air must pass.

The pipe $e$ serves for conducting water into the casing $a$, and the pipe $e'$ for drawing off the water. The casing $a$ is provided at one end with the neck $f$, containing a damper-valve $g$, by means of which the quantity of fresh air admitted into the apparatus can be regulated, as said neck $f$ is to be connected with the fresh-air inlet.

The operation is as follows: When the fan-shaft $b$ is rotated at a high speed, the drum $d$ is rotated at a comparatively smaller speed. The fan-shaft draws in the air through the end of the lateral extension $a'$ and draws in a greater or less quantity of fresh air through the neck $f$. The air is compelled to pass through the spaces or interstices between the rods $d^2$ in the drum $d$, in order to pass out through the opening shown in dotted lines in Fig. 1, and in so doing must travel in a more or less serpentine course and come in contact with a great number of rods $d^2$. As said drum $d$ rotates, the buckets or dippers D' raise a quantity of water, and as the drum continues to rotate, the water flows from said dippers or buckets through the openings D of the drum $d$ upon the rods $d^2$ and through the spaces or interstices between the rods and comes in contact with the air circulating between the rods. The water is thus evaporated very rapidly, as it is brought in contact with a very large evaporating-surface on the faces of the rods, and the air passing through the apparatus is thoroughly saturated with moisture.

Having thus described my invention, I claim as new and desire to secure by Letters Patent—

1. In an air-moistening apparatus, the combination, with a casing, of a rotating drum, rods secured in said drum, water dippers or buckets on the said drum and serving to raise the water from the bottom of the casing and pour it over the rods, and a fan in part of the casing, substantially as set forth.

2. In an air-moistening apparatus, the combination, with a casing, of a fan-shaft, a fan thereon, a rotating drum containing a series of rods extending in the direction of the length of the drum and arranged circumferentially on a spiral line, and gearing for drawing said drum from the fan-shaft, and buckets or dippers in the rim of said drum for the purpose of lifting water from the bottom of the casing and pouring it on the rods, substantially as set forth.

3. In an air-moistening apparatus, the combination, with a casing, of a fan-shaft, a fan thereon, a drum mounted to rotate in the casing, the shell of which drum is provided with a series of longitudinal openings, a series of rods in said drum in the direction of the length of the drum and arranged circumferentially on a spiral line, buckets or dippers on the shell of the drum at the above-mentioned openings for the purpose of lifting the water from the bottom of the casing and pouring it upon the rods, and gearing for rotating the drum from the fan-shaft, substantially as set forth.

In testimony that I claim the foregoing as my invention I have signed my name in presence of two subscribing witnesses.

ALBERT SCHMID.

Witnesses:
 EDUARD WOHNLICH,
 KARL DUSCHANCKE.